Patented July 18, 1933

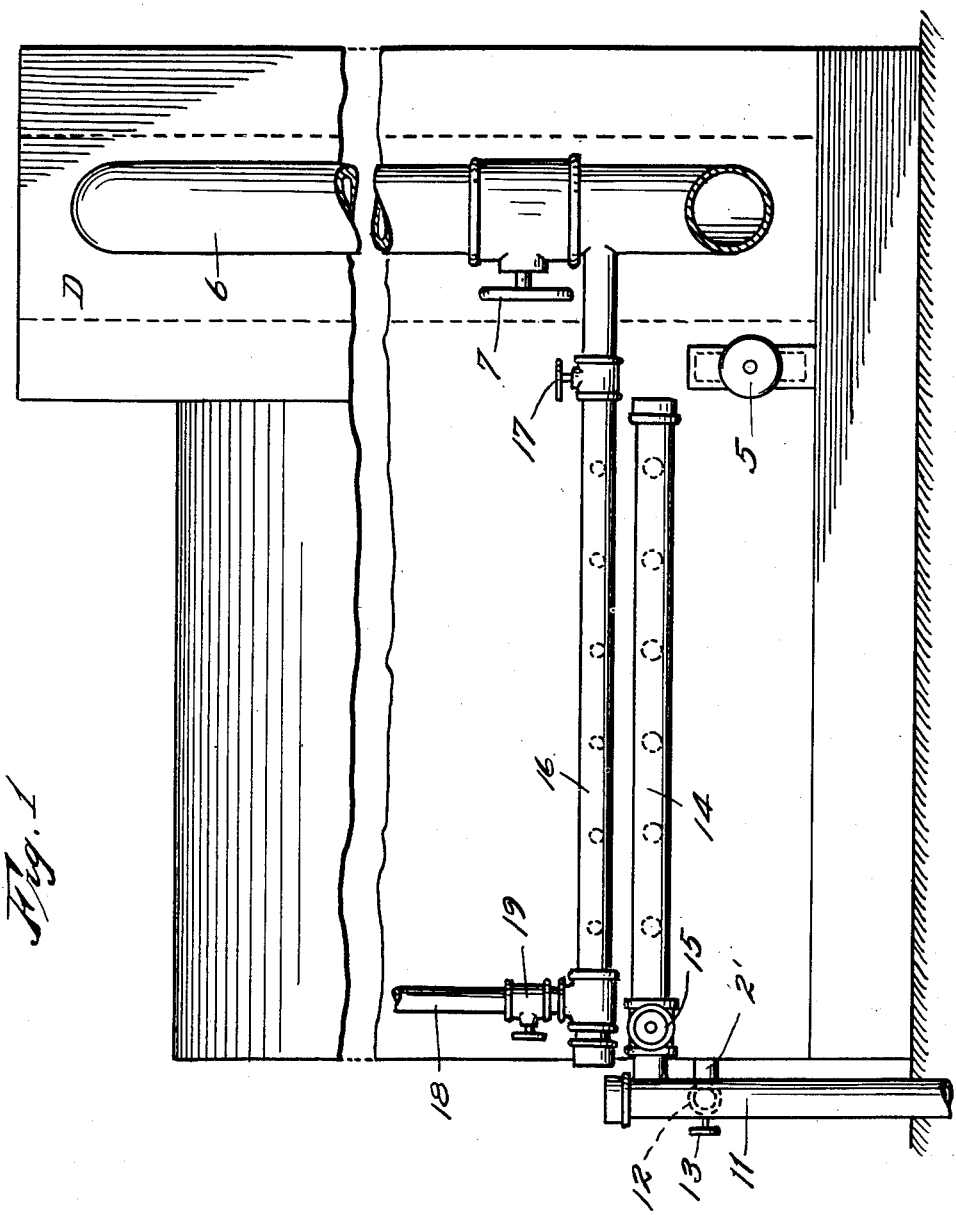

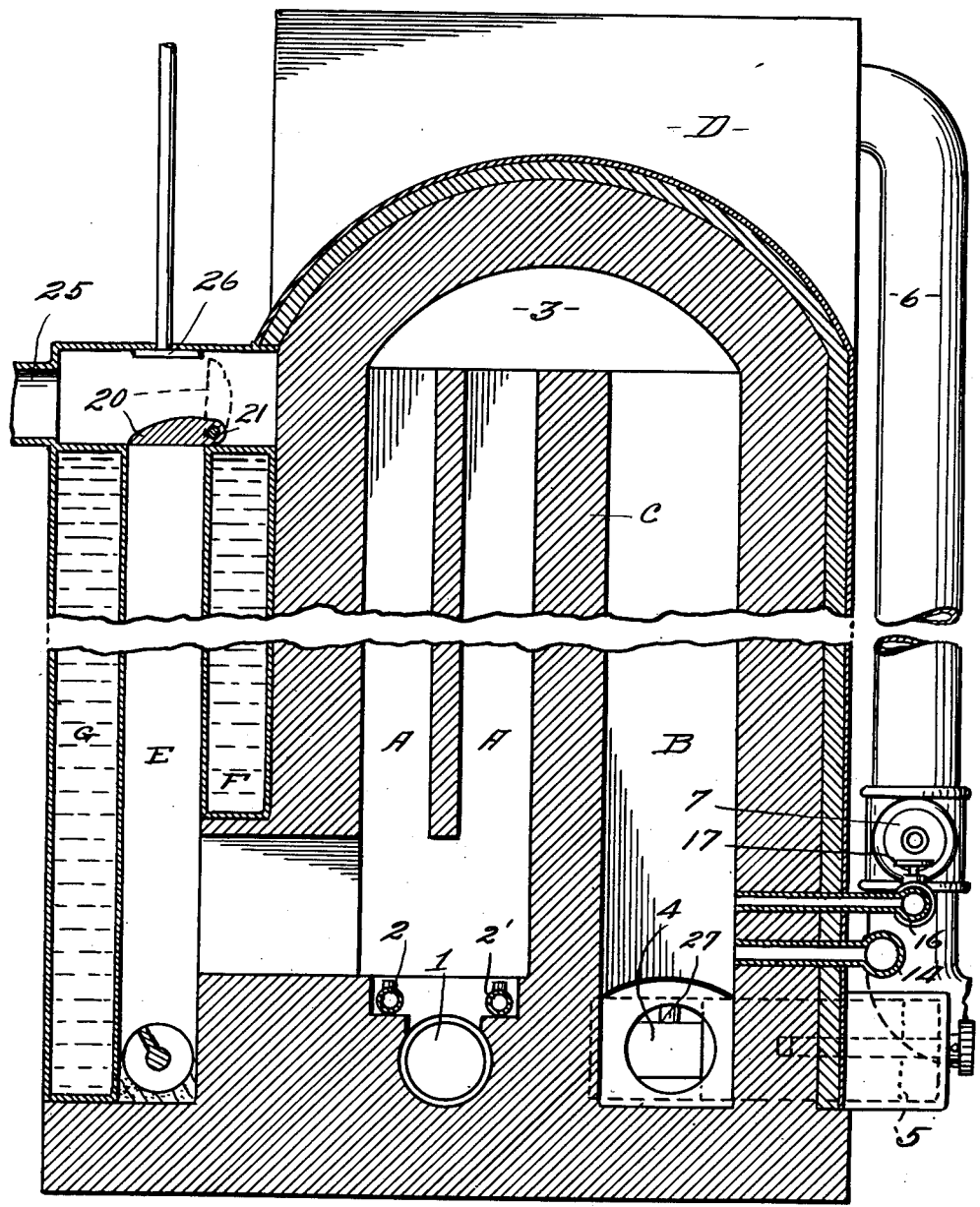

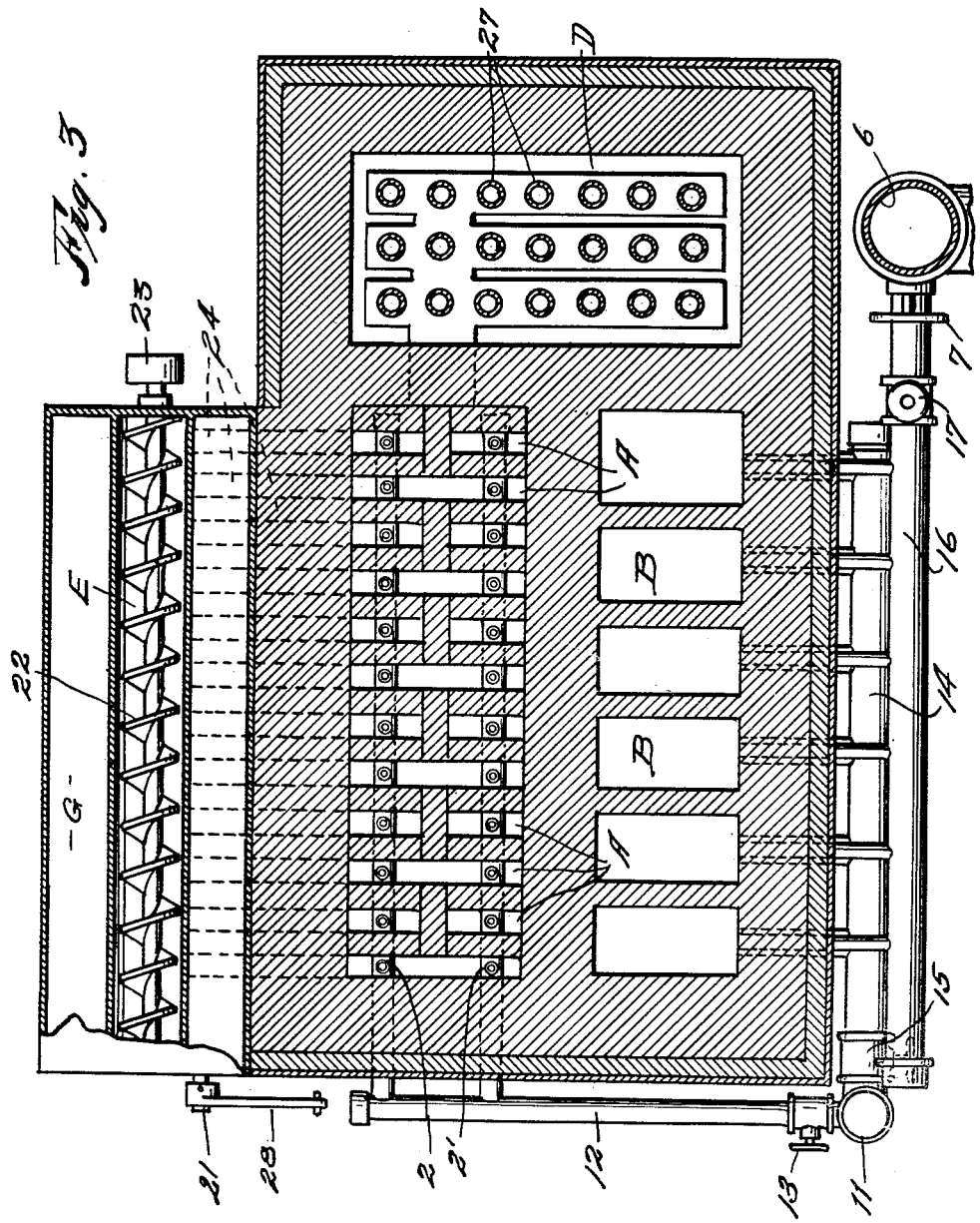

1,918,362

UNITED STATES PATENT OFFICE

WILLIAM D. WILCOX, OF LAWRENCE, KANSAS

PROCESS OF DISSOCIATING HYDROCARBON GASES AND VAPORS TO OBTAIN FINELY DIVIDED CARBON AND A MIXTURE OF NITROGEN AND HYDROGEN IN CONTROLLED PROPORTIONS

Application filed August 13; 1930. Serial No. 474,945.

The union by synthesis of nitrogen and hydrogen in the volumetric ratio of one and three to form ammonia has become a very important industry. It is the primary purpose of my process to supply an economical and efficient means of obtaining a gaseous mixture of nitrogen and hydrogen in the required proportions from hydrocarbon gases such as natural gas, coal gas, or the residue gases from the cracking of petroleum oils. These gases may be converted to hydrogen and oxides of carbon by subjecting them to a high temperature in admixture with steam, which provides the oxygen to convert the carbon of the hydrocarbons to its oxides. The monoxide being further oxidized to dioxide, and the dioxide absorbed out, there remains hydrogen. Nitrogen obtained from the air by liquefaction and fractionation, may be added in the desired proportion or a portion of the hydrogen may be burned with air according to the equation, $2H_2 + O_2 + 4N_2 = 4N_2 + 2H_2O$. The water vapor being condensed out, there remains a volume of nitrogen freed from the oxygen with which it exists in the atmosphere. I have developed a process which appears to be rather more direct and to yield a by-product of finely divided carbon having a value substantially greater than the value of the hydrogen which might be obtained from it through processes now in use.

Instead of converting the carbon of the hydrocarbons to oxides of carbon by dissociating with steam at high temperature I burn such a portion of the carbon in the hydrocarbon gases with air as provides the required proportion of oxygen freed nitrogen, utilizing the heat generated to assist in the dissociation of the hydrocarbons, and recover the residue of carbon in a finely divided form, of greater value for other uses than as a source of heat for the dissociation of steam to produce additional hydrogen.

In carrying out this process, I employ apparatus such as described in my copending application No. 443,903, the drawings of which are filed herewith. The procedure can be better understood by reference to these drawings. Figure 1 shows a front elevation of a furnace, together with the adjacent heat exchange. 2 is a pipe supplying fuel gas to the base of the furnace; 11 is the main pipe supplying fuel gas; 12 is a pipe conveying fuel gas to inlet pipe 2; 13, a valve on this pipe; 14 is a manifold pipe supplying the gas to be dissociated; 15, a valve on this pipe; 6 is a main air pipe supplying air to the heat exchange; 7, a valve on this pipe; 16 is a manifold pipe conveying air from 6 or steam from 18, through valves 17 or 19; 5 is a valve closing the connection between the base of the furnace and the heat exchange.

Figure 2 shows a vertical cross section of the furnace. A—A shows a portion of what I call the dissociation chamber; C is a dividing wall within the furnace with an opening through above its upper extremity; 3, connecting A—A with B, which I may describe as a preheating chamber; 1 is an opening from the base of the heat exchange chamber admitting air to the base of A—A; 2—2 are pipes supplying fuel gas; 4 is an opening from the base of B into the heat exchange chamber, closable by valve 5; E is an outlet from the base of A, closable by stack valve 20; G and F are chambers containing water; 25 is an outlet from E; 26 shows means for removing carbon from the inner walls of F and G.

Figure 3 is a horizontal cross section which shows heat exchange chamber D, containing air pipes 27—27, etc., showing also means of operating valve, 20, and flues placed in A, and extending through the wall of A to E, 24.

These drawings show all of the working parts necessary to carrying out so much of my procedure as is new in the art, but I do not restrict myself to the particular form of apparatus shown, or to an identical arrangement of the working parts.

The first step in my procedure is to secure the high temperature within A necessary to effect a rapid and complete dissociation of the hydrocarbons according to the general formula $CH_4 + \text{heat} = C + 2H_2$. Combustible gas is admitted through 2—2, air through 1, under pressure and with means provided for a close control of their relative volumes. They are ignited. The combustion gases rise through A, pass over through 3 and down through B, thence pass through 4, 5 being opened, into the base of heat exchange chamber D and upward to the air. The air, entering through 1, is concurrently passing down through pipes 27—27, and is shortly brought to a high temperature which increases progressively as the resulting flame temperature and sensible heat in the combustion gases are increased. The importance of the heat exchange is not due to the fuel economy which results, but to the much higher flame temperature with more rapid transfer of heat to the surfaces of the flues 24—24 in A. The temperature desirable is limited only by the ability to create it within a reasonable interval of time and the ability to obtain refractory materials for the construction of the flues resistant to this temperature—operating temperatures in the base of A will preferably be within the range 2200° to 2700° F. It is apparent that the temperature of the flues will be progressively lower as the combustion gases pass toward outlet 4. Adequate temperatures being attained, the air is shut off. After a brief interval sufficient for the entering gas to purge the combustion products from A and B by displacement, valve 13 supplying gas to 2—2 is closed. Valve 5 is closed. Valve 20 is opened. Valves 15 on 14, and valve 17 on 16 are now opened, supplying closely controlled proportions of hydrocarbon gases from 11, and of air from 6. So much air only will be admitted as will supply the desired volumetric ratio of nitrogen to the hydrogen in the final product. Assuming the hydrocarbon gas to be pure methane, the volume of air will be almost exactly equal to the volume of gas.

$$5CH_4 + O_2 + 4N_2 + heat = 2CO + 3C + 10H_2 + 4N_2$$

The CO being later converted to dioxide according to the equation $$CO + H_2O = CO_2 + H_2$$

and the carbon dioxide absorbed out, the final result will be a mixture, $12H_2 + 4N_2$. The composition of the gas being known, a very close adjustment in the proportions may be achieved. Where the hydrocarbon gases contain some nitrogen, the proportion of air will be reduced. Some small reduction in the proportion of air introduced may be necessary to offset lack of completeness in the conversion of carbon monoxide and steam to hydrogen and carbon dioxide or loss of hydrogen in removing the carbon dioxide. Operative experience will shortly reveal the proportions required and means are readily available for ascertaining and controlling the rate of input of both gas and air. It will be readily apparent to those who are familiar with combustion, that the amount of air introduced is entirely inadequate to form an explosive mixture. Except as brought to a high temperature by external heating, the oxygen in the air will not react with the hydrocarbons, but it is also apparent that as the mixture rises through B in contact with progressively more highly heated surfaces, it will ultimately be brought to the temperature of ignition. While the earlier reactions at temperatures only slightly above the ignition temperature may be represented by the equations $C + O_2 = CO_2$ and $H_2 + O = H_2O$, it is apparent that as the temperature of the mixture passes beyond 1800°, the secondary reactions $C + CO_2 = 2CO$ and $C + H_2O = CO + H_2$ will take place. One cubic foot of $CH_4$ converted to CO and hydrogen according to the equation $$CH_4 + O = CO + 2H_2$$

will generate 143 B. t. u. of which 105 B. t. u. are absorbed in effecting the separation of the carbon and hydrogen in the methane molecule, leaving 38 B. t. u. available for raising the temperature of the gaseous mixture and supplying the heat required to dissociate the remaining hydrocarbons according to the equation $CH_4 + heat = C + 2H_2$.

Assuming again for simplicity of illustration, that the hydrocarbon be a pure methane, and equal volumes of methane and air admitted, 40% of the carbon will be converted to monoxide, two cubic feet out of five will be dissociated by this combustion. There will remain three cubic feet requiring 315 B. t. u. for their dissociation. The combustion of the two feet having supplied 76 B. t. u. there must be provided from the heat absorbed in the adjacent surfaces 239 B. t. u. in addition to whatever heat is required to bring the gaseous mixture to the high temperature required for a rapid and complete dissociation.

My process is quite distinct from the several processes in which it is sought to obtain carbon in finely divided form by bringing together hydrocarbon gases and inert gases or air previously heated, or where an amount of air sufficient to support combustion, but insufficient to complete it is added to the gas. Some carbon may be recovered at temperatures of dissociation at which $C + O_2 = CO_2$ and $H_2 + O = H_2O$ predominate and there is little, if any, of the secondary reactions $C + CO_2 = 2CO$ or $C + H_2O = CO + H_2$. One inventor heats air to a quite high temperature, gas to a temperature just short of that at which dissociation begins, and unites them. He has found it advisable to pass the mixture into an externally heated chamber, through the walls of which heat may be passed to make good the loss of heat incident to the reaction $CH_4 + heat = C + 2H_2$, which is not supplied by the reaction $CH_4 + O = CO + 2H_2$ also occurring. His minimum temperature as stated in his specification is 1200° F. It is regarded as quite certain that temperatures such as will bring about a complete dissociation cannot be imparted through walls of refractory material. Another inventor introduces sufficient air to maintain an active combustion within a furnace, but insufficient to effect a complete combustion. It is quite clear to me that the proportion of air he uses must of necessity be much greater than I employ and the best results in the recovery of carbon effected at temperatures in which hydrogen burned to water vapor with a substantial evolution of heat remains such and is not reconverted to hydrogen by the water gas reaction. This is confirmed in his specification and claims. He proposes to admit so much air as will cause the carbon dioxide to greatly exceed the carbon monoxide stated in one claim to be three times the carbon monoxide and to create a temperature above 1400° F. In another claim he stipulates excess of 1000° F. His procedure may be effective in obtaining carbon, but the residue gas will surely contain a substantial proportion of undecomposed hydrocarbons.

Where combustion is to $CO_2$ and $H_2O$, more heat is evolved, less carbon is oxidized for any given volume of air, more is available for recovery. A considerable recovery may be made without complete dissociation. It is imperative for my purpose that this dissociation be complete. The dissociation can be carried on only for the interval during which the wall surfaces are at a sufficiently high temperature to effect this. Reheating cycles will be frequent. Preparatory to reheating, both the gas and air are shut off, and for a very brief interval, steam may be introduced into the base of B through pipe 18 by opening valve 19. This steam contacts with any carbon deposited upon the walls of A, and yields water gas according to the equation $C + H_2O = CO + H_2$.

In the event that I find it possible to so operate as to prevent any substantial adherence of carbon to the walls, air may be used in place of steam as the purging media. It is proposed to construct the furnace A—B of such a height that the gases may be passed through at a high velocity without reducing the necessary time of contact with the heated walls to effect complete dissociation. By means of this high velocity, the finely divided carbon evolved will be carried forward and will not adhere to the walls. To prevent loss of carbon by its remaining in the furnace, vertical flues will be substituted in place of the loosely piled refractories or checker brick filling supplying horizontal surfaces specified by others. Cooling of the gas as accomplished in E is not for the purpose of effecting its deposition, but to so reduce the temperature that it can be passed through an electric precipitation unit or through screens for the separation of the carbon. Following this, a large volume of steam may be added to the gas, the carbon monoxide converted to dioxide with increase in the volume of hydrogen and the carbon dioxide removed by well-known means, leaving a mixture of nitrogen and hydrogen in substantially the proportions required for the synthesis of ammonia.

What I claim as new and desire to protect by the issuance to me of Letters Patent is:

1. The steps in the process of dissociating hydrocarbon gases and vapors to obtain finely divided carbon and a mixture of hydrogen and nitrogen in the volumetric ratio of three and one, which comprises heating the interior of a conduit having a filling of a refractory material to a temperature in excess of 2000° F. by maintaining an active combustion of fuel gas within the conduit, then passing through the conduit in a direction counter current to the travel of the combustion gases through the conduit a mixture of hydrocarbon gases together with air in such volume as will supply the desired proportion of nitrogen in the resultant gas, removing the entrained carbon from the issuing gas.

2. The process of obtaining carbon black and a mixture of hydrogen and nitrogen in controlled proportions, which comprises heating the interior of a conduit having a filling of refractory material to a temperature in excess of 2000° F. by maintaining an active combustion of fuel gas within the conduit, then passing through the conduit in a direction counter current to the travel of the combustion gases through the conduit hydrocarbon gases together with air in a volume sufficient to provide the desired proportion of nitrogen in the product gas, removing the entrained carbon from the issuing gas and eliminating the oxides of carbon by known means.

3. The steps in the process of obtaining finely divided carbon and a mixture of nitrogen and hydrogen in determined proportions by the dissociation of hydrocarbon gases and vapors, which comprises heating the interior of a conduit having a filling of refractory walled flues to a temperature in excess of 2000° F. by maintaining an active combustion of fuel gas within the conduit, then passing hydrocarbon gases with a volume of air added thereto sufficient to supply the desired ratio of nitrogen to the recovered gas through the conduit in a direction counter current to the travel of the combustion gases through the conduit, withdrawing the gaseous product and removing the entrained carbon from the gas.

4. The steps in the process of obtaining finely divided carbon and a mixture of nitrogen and hydrogen in determined proportions by the dissociation of hydrocarbon gases and vapors, which comprises heating the interior of a conduit having a filling of refractory material to a temperature in excess of 2000° F. by maintaining an active combustion of fuel gas within the interior of the conduit, using the sensible heat of the discharged combustion gases to preheat by heat exchange the air which supports the combustion of the fuel gas, then passing through the conduit in a direction counter current to the travel of the combustion gases a mixture of hydrocarbon gases with a volume of air sufficient to provide the desired proportion of nitrogen in the gaseous product, withdrawing the resulting gas and recovering the entrained carbon.

5. The improvement in the process of obtaining finely divided carbon and a mixture of nitrogen and hydrogen in determined proportions by the dissociation of hydrocarbon gases and vapors by their passage in admixture with a volume of air sufficient to supply the desired proportion of nitrogen through a conduit filled with refractory materials heated to a temperature in excess of 2000° F. by a precedent internal combustion, which comprises so extending the length of travel through the conduit that the required time of contact to effect dissociation may be had with a velocity of passage through the conduit such as substantially prevents adherence of the evolved carbon to the interior surfaces of the conduit.

6. The process of obtaining carbon black together with a mixture of nitrogen and hydrogen, which comprises heating the interior of a conduit having a filling of refractory material to a temperature in excess of 2000° F. by maintaining an active combustion therein, then passing through the conduit in a direction counter current to the travel of the combustion gases through the conduit hydrocarbon gases with an addition thereto of air in a volume less than sufficient to form an explosive mixture, removing the carbon evolved from the issuing gas and conserving the gas.

WILLIAM D. WILCOX.